United States Patent [19]

Byers

[11] 3,990,035

[45] Nov. 2, 1976

[54] HOUSING CONFIGURATION FOR HIGH RESOLUTION SONAR

[75] Inventor: Jimmy F. Byers, Georgetown, Tex.

[73] Assignee: The United States of America as represented by the Secretary of the Navy, Washington, D.C.

[22] Filed: Sept. 5, 1975

[21] Appl. No.: 610,805

[52] U.S. Cl. .............................. 340/8 R; 206/328; 217/25.5; 220/4 C; 340/3 T

[51] Int. Cl.$^2$ .............................. H04B 13/00

[58] Field of Search ............ 181/198; 340/3 T, 8 R, 340/8 PC, 8 MM, 8 D, 8 C, 8 S, 9, 10, 11, 12 R, 13 R, 14; 114/16 R, 235 B; 9/8 R; 220/4 C, 4 D, 20; 206/328; 217/25.5

[56] References Cited

UNITED STATES PATENTS

| | | | |
|---|---|---|---|
| 514,051 | 2/1894 | West | 217/25.5 |
| 2,419,608 | 4/1947 | Turner, Jr. | 340/12 R |
| 2,925,581 | 2/1960 | Hackley et al. | 340/9 X |
| 2,972,068 | 2/1961 | Howry et al. | 340/8 L |
| 3,191,791 | 6/1965 | Jackson | 217/25.5 |
| 3,308,423 | 3/1967 | Massa, Jr. | 340/8 R |
| 3,319,220 | 5/1967 | Massa, Jr. | 340/12 R |
| 3,441,903 | 4/1969 | Massa, Jr. | 340/8 R |
| 3,474,750 | 10/1969 | Bleu | 114/235 B |
| 3,774,564 | 11/1973 | Bondon et al. | 9/8 R |
| 3,908,852 | 4/1975 | Ricobene et al. | 217/25.5 |

*Primary Examiner*—Harold Tudor
*Attorney, Agent, or Firm*—Richard S. Sciascia; Don D. Doty; Harvey A. David

[57] ABSTRACT

A hydrodynamically streamlined, towable sonar apparatus is described characterized by a housing, including a central frame having a circular planar web portion from which extend a plurality of annular coaxial ribs which cooperate with similar ribs extending inwardly from top and bottom concavo-convex cover members to define annular chambers and to provide compressive load bearing support. Transducers are arrayed on the periphery of the frame and enclosed in a curved plastic fairing thereabout. Electronics are accommodated in the annular chambers.

11 Claims, 3 Drawing Figures

HOUSING CONFIGURATION FOR HIGH RESOLUTION SONAR

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention relates to underwater instrumentation, and more particularly to streamlined, water-tight, and pressure resistant housings for electronic components such as sonar projectors, hydrophones, and associated signal processing elements. The invention is notably well suited for use in curved face, multiple-beam high frequency, towed sonar units for deep submergence operation. However, it is also suitable for housing other condition responsive instruments, and their associated electronic elements, such as television cameras, magnetometers, water pressure, velocity detectors, and the like.

Heretofore, it has been the general practice to house the various underwater subsystems of sonars, for example, in discrete pressure resistant housing or canisters that were then collectively surrounded by an additional outer skin or shell for hydrodynamic and handling considerations. The disadvantages of separate housings include increased air weight, size, and bulk, and the need for more interfacing hardware such as cables, cable plugs, etc., and the attendant increases in likelihood of leaks, electrical failures, and the like. In addition, the resultant outer skin or shell shapes have often been frail and subject to damage both on deck and while towed or propelled, and have often been of large frontal area and lacking in symmetry, thereby increasing drag, decreasing maneuverability, and introducing problems of towing stability. The complexities of such hardware has generally resulted in inordinately high fabrication and servicing costs.

SUMMARY OF THE INVENTION

The present invention aims to overcome most or all of the aforementioned shortcomings of the prior art through the provision of a water-tight, pressure-resistant, and streamlined housing, of novel construction, that is adapted to accommodate all of the associated elements of a sonar, or other sensing system, that are desirably packaged for submergence together.

With the foregoing in mind it is a principal object of the invention to provide an improved underwater instrumentation housing.

Another important object of the invention is the provision of such a housing that is light in weight, rugged, inexpensive, reliably water and pressure resistant, and hydrodynamically acceptable for towing or propulsion.

Still another object is to provide a housing of the foregoing character that is easily and quickly opened and closed for access to interior elements for purposes of testing, inspection and servicing.

As yet another object, the invention aims to accomplish the above objects through the provision of a housing comprising a center section that is circular in plan and includes a plurality of annular, concentric compartments separated by annular, concentric or coaxial, ribs, in combination with top and bottom lids or covers, each having annular, concentric ribs adapted to cooperate with those of the center section to provide a crush resistant structure that is sealed against water entry by a circular sealing means, e.g. O-rings.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
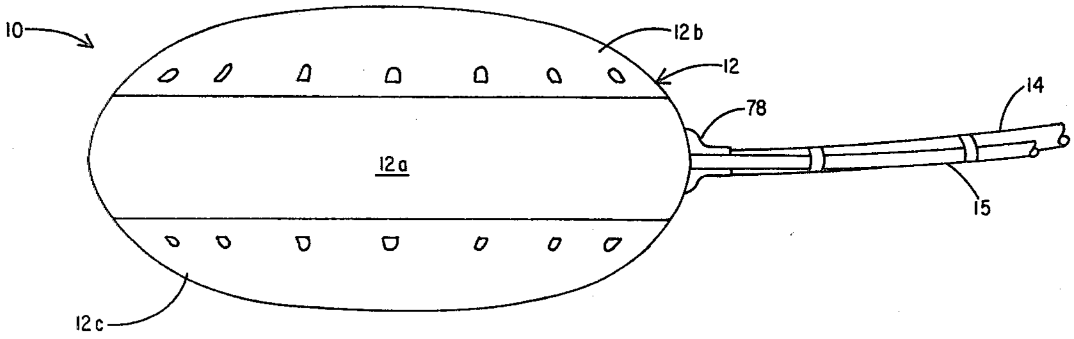
FIG. 1 is a side elevation of a deep submergence, towed sonar apparatus embodying the invention.

In the form of the invention illustrated in the drawings and described hereinafter, a high resolution, deep submergence, towed sonar apparatus 10 comprises a hydrodynamically streamlined and pressure resistant housing, generally indicated at 12, that is adapted to be towed through an aqueous medium by a towing vehicle, such as a surface vessel or a helicopter, through the agency of a towing cable 15. An electrical cable 16 provides for the conduction of electrical power and/or information bearing signals between the towing vehicle and the apparatus 10.

Figure 2:
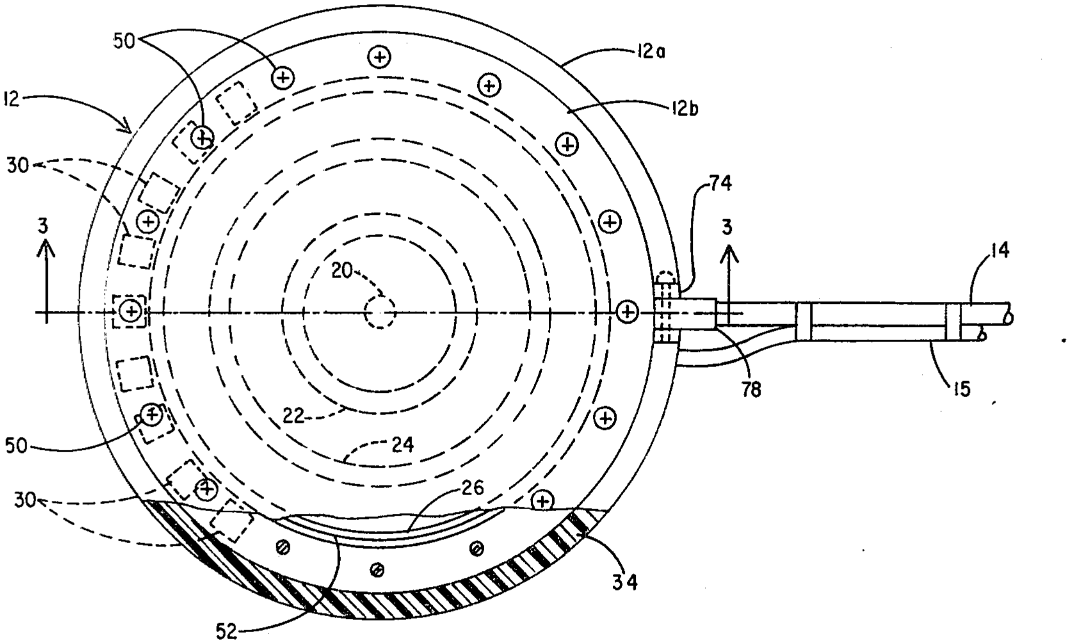
FIG. 2 is a fragmentary plan view of the apparatus of FIG. 1.

Housing 12 is characterized by a low, substantially oval profile in side elevation, and is circular in plan, as is best illustrated in FIG. 2. This streamlined housing configuration incorporates what is known as a Joukowski streamlined shape and is characterized by a diameter that is, or is close to, twice the thickness thereof. Housing 12, which is preferably formed principally of a rigid, solid material such as aluminum, includes a central portion **12*a* and top and bottom lid members or covers 12*b* and 12*c***.

Figure 3:
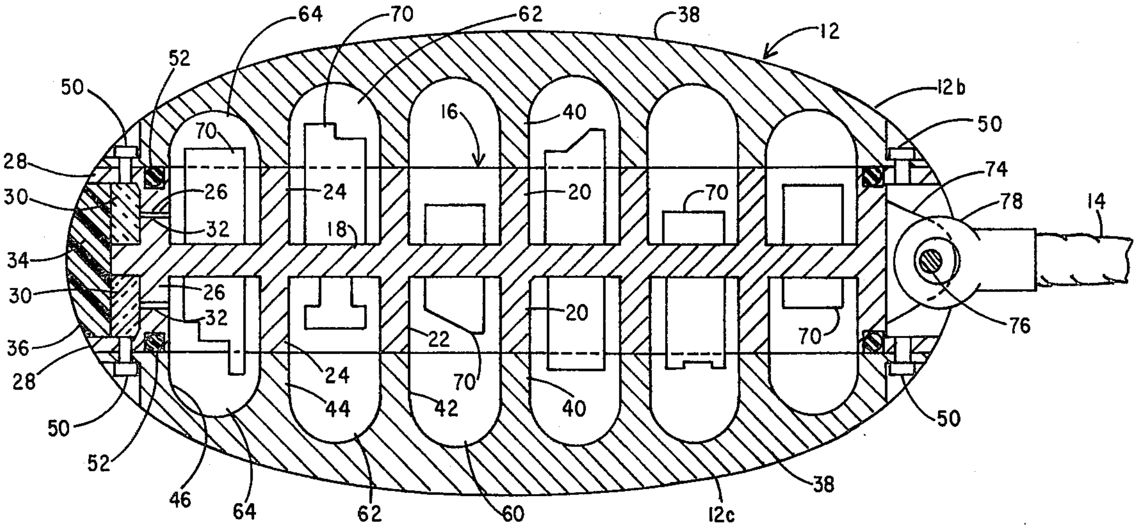
FIG. 3 is a sectional view, on an enlarged scale, of the sonar apparatus as viewed substantially along line 3—3 of FIG. 2.

Referring now to FIG. 3, central portion **12*a* comprises a central frame 16 having a planar center wall or web 18 that is generally circular in plan. Extending in opposite directions, upwardly and downwardly from web 18, are central posts 20 and a plurality of annular, radially spaced, and coaxial ribs 22, 24, and 26. The outermost ribs 26 are conveniently provided with radially extending flanges 28.**

Mounted on the outer surfaces of ribs 26, between flanges 28 and an extending portion of web 18, are a plurality of electroacoustic transducers 30. These transducers are arranged in rows as a peripheral array and are adapted to project and/or receive acoustical energy. Suitable waterproof compound, such as an epoxy resin, is advantageously used between adjacent ones of the transducers and between the transducers and the flanges 28.

Openings 32 are provided through ribs 26 to pass electrical conductors to various electronic elements housed in housing 12.

Disposed in overlying relation to the array of transducers 30 is a hydrodynamic fairing 34, which in this example serves also as an acoustic window. Fairing 34 is preferably formed of a suitable waterproof, and solid plastic material such as neoprene rubber, acrylic resin, polyurethane, or the like, having a desired acoustic transmission capability. The surface 36 of fairing 34 is curved to provide a more hydrodynamically efficient shape to the central portion 12*a* of housing 12 than would be achieved without its presence. Additionally, the index of refraction of the material of fairing 34, together with the curvature of surface 36 thereof, can in some applications be selected according to well understood principals to cause the fairing to serve also as an acoustic lens.

Covers 12*b* and 12*c* are identical in this example, each comprising a concavo-convex wall portion 40 having the convex surface thereof facing outwardly of the housing 12. Extending inwardly from each wall portion 38 are a central post 40 and a plurality of annular, radially spaced and coaxial ribs 42, 44 and 46 corresponding in diameters to ribs 22, 24 and 26, respectively of central frame 16. The outermost ribs 46 are of sufficient width to present an annular mating surface that is substantially congruent with the corresponding rib 26 and flange 28 thereof. A plurality of releasable fastening elements in the form of screws 50 extend through apertures in the periphery of covers 12*b* and 12*c* and are threadedly engaged in the respective flanges 28. Covers 12*b* and 12*c* are thereby readily assembled or removed. A resiliently pliable O-ring 52 is recessed into the edge of each rib 26 and cooperates with the opposing rib 46 to provide a water and pressure resistant seal between the covers and the central portion of housing 12.

It will be seen that the cooperating, radially spaced ribs of the covers and the central frame provide cover wall to cover wall load bearing support, appropriately distributed to lend great crush resistance to the housing 12 in spite of the thinness of the walls thereof. It will also be seen that the cooperating ribs define a plurality of annular, radially spaced and coaxial chambers 60, 62, and 64 within housing 12 and on opposite sides of web 18.

Chambers 60, 62, and 64 accommodate electronic components or elements represented by blocks 70 of various geometrical form. These components may include, for example, amplifiers, sonar beam forming signal processors, information signal multiplexers, and other electronic devices well known in their association with sonar or other underwater instrumentations.

Housing 12 is adapted to be attached to cable 14, for towing, by the provision of a pair of spaced, apertured ears 74 extending from ribs 26 to form a clevis. A clevis pin 76 extends through the ears 74 and through the eye of a cable end fitting 78.

Electrical cable 15 extends through an appropriate penetration seal 80 in rib 26 to the interior of housing 12, for connection to one or more of the electronic elements 70 therein. Any well known hull penetration seal may be used, for example potting material poured around the cable at its point of emergence.

The central frame 16 and the covers 12*a*, 12*b* can, because of their circular symmetry, be manufactured by turning on a lathe from a solid blank. Alternatively they may be readily formed as castings, stampings, or forgings, with mere finishing machining being required.

Although only one O-ring is shown in the preferred embodiment, it will be recognized that O-rings may be provided between the mating surfaces of others of the ribs to isolate one or more of the chambers 60, 62, 64 from one another. Moreover, the cooperating ribs may be increased or decreased in number and/or spacing as the use to which the housing is to be put dictates.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A rigid, submersible housing for supporting and protecting, at substantial water depths, condition responsive instrumentation and associated electronic elements forming part of an instrument system, said housing comprising:

a central frame member including a circular planar wall portion and a plurality of annular, coaxial rib portions extending from opposite sides of said planar wall portion and normal thereto;

first and second cover members, each comprising a concavo-convex wall portion the convex side of which is directed outwardly away from said central frame member and the concave side of which is directed inwardly toward said central frame member, said first and second cover members each having a peripheral edge portion in engagement with a rim of the outermost of said annular rib portions of said central frame member;

said first and second cover members being further characterized by annular, coaxial rib portions, corresponding in diameter with rib portions of said central frame member and extending inwardly from said concave side of the respective cover member into engagement with corresponding ones of said rib portions of said central frame member, whereby said rib portions of said central frame member and of said first and second cover members cooperate to define a plurality of coaxial, annular electronic instrumentation compartments within said housing and also to provide compressive load bearing support between said concavo-convex wall portions of said first and second cover members.

2. A housing as defined in claim 1, and wherein:

said central frame member comprises central post portions extending from said planar wall portion; and said cover members comprise central post portions extending inwardly into engagement with the post portions of said central frame member.

3. A housing as defined in claim 1, and further comprising:

annular sealing gasket means, disposed between said peripheral edge portion of each said cover members and the respective rims engaged thereby, for providing a watertight seal between each of said cover members and said central frame member.

4. A housing as defined in claim 1, and further comprising:

releasable fastener means, interconnecting each of said cover members and said central frame member, for securing said cover members to said frame member.

5. A housing as defined in claim 2, and further comprising:

annular sealing gasket means, disposed between said peripheral edge portion of each said cover members and the respective rims engaged thereby, for providing a watertight seal between each of said cover members and said central frame member.

6. A housing as defined in claim 5, and further comprising:

releasable fastener means, interconnecting each of said cover members and said central frame member, for securing said cover members to said frame member.

7. A housing as defined in claim 6, and further comprising:

towing attachment means, fixed to said central frame member at a peripheral location thereof, for towing of said housing through water.

8. A housing as defined in claim 6, and further comprising:

fairing means, fixed to the periphery of said central frame member and providing a smoothly curved edge surface extending between said convex surfaces of said cover members, for providing said housing with a hydrodynamically favorable configuration.

9. A housing as defined in claim 7, and further comprising:

fairing means, fixed to the periphery of said central frame member and providing a smoothly curved edge extending between said convex surfaces of said cover members, for providing said housing with a hydrodynamically favorable configuration.

10. A housing as defined in claim 9, and wherein:

said fairing means comprises a body of plastic material having a predetermined index of refraction that differs from that of water, whereby said fairing means is characterized by the abulity to operate as a lens.

11. A high frequency, multiple beam sonar apparatus for towing underwater, said apparatus comprising in combination:

a watertight housing comprising a circular, central frame having a planar web from each side of which extend a plurality of radially spaced, annular ribs, first and second circular covers fixed to opposite sides of said central frame and each presenting an outer convex surface and inwardly extending, radially spaced annular ribs in enegagement with corresponding ribs of said central frame, whereby said housing defines a plurality of coaxial, annular compartments;

a plurality of electroacoustic transducer elements, disposed in predetermined array and fixed to the outer surfaces of the outermost of said annular coaxial ribs of said central frame, for projection and reception of acoustical energy;

plastic fairing and acoustic window means, disposed over said transducer elements and substantially around the periphery of said central frame, for providing streamlining of said housing;

electronic means, disposed in said annular compartments, for driving at least part of said transducer elements;

electronic means, disposed in said annular compartments, for effecting processing of electrical signals resulting from imprimgement of acoustic energy on at least part of said transducer elements; and means, connected to said housing, for towing said apparatus through a water medium and for conducting electrical signals between said apparatus and a towing vehicle.

* * * * *